(12) United States Patent
McKittrick et al.

(10) Patent No.: US 12,425,504 B2
(45) Date of Patent: Sep. 23, 2025

(54) KICKSTAND WITH RADIO FREQUENCY (RF) WINDOW

(71) Applicant: Dell Products, L.P., Round Rock, TX (US)

(72) Inventors: Allen B. McKittrick, Cedar Park, TX (US); Changsoo Kim, Cedar Park, TX (US); Shruti Srivastava, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 372 days.

(21) Appl. No.: 17/653,712

(22) Filed: Mar. 7, 2022

(65) Prior Publication Data

US 2023/0283702 A1  Sep. 7, 2023

(51) Int. Cl.
  *H04M 1/04* (2006.01)
  *G06F 1/16* (2006.01)

(52) U.S. Cl.
  CPC ............ *H04M 1/04* (2013.01); *G06F 1/1633* (2013.01)

(58) Field of Classification Search
  CPC ...... H04M 1/04; G06F 1/1633; G06F 1/1656; G06F 1/166; G06F 1/1698
  See application file for complete search history.

(56) References Cited

U.S. PATENT DOCUMENTS

| | | | | |
|---|---|---|---|---|
| 6,111,550 A * | 8/2000 | Miller | ............... | H01Q 11/04 343/826 |
| 7,203,533 B1 * | 4/2007 | Tischer | ............... | H01Q 1/40 455/575.8 |
| 9,203,137 B1 * | 12/2015 | Guterman | ............... | H01Q 1/243 |
| 9,287,612 B2 * | 3/2016 | Bolin | ............... | H01Q 9/06 |
| 9,949,218 B1 * | 4/2018 | Lau | ............... | H04M 1/72409 |
| 10,269,485 B2 * | 4/2019 | Henty | ............... | F16B 1/00 |
| 11,031,674 B1 * | 6/2021 | Ramasamy | ............... | H01Q 1/2266 |
| 2003/0007322 A1 * | 1/2003 | Amemiya | ............... | H01Q 1/084 361/679.27 |
| 2003/0142470 A1 * | 7/2003 | Krieger | ............... | H04N 7/142 348/E7.079 |
| 2003/0236102 A1 * | 12/2003 | Kawai | ............... | G06F 1/166 455/575.8 |
| 2009/0267522 A1 * | 10/2009 | Nakamura | ............... | H05B 45/30 315/136 |
| 2010/0203883 A1 * | 8/2010 | DeMarco | ............... | H04M 1/04 455/427 |
| 2010/0321255 A1 * | 12/2010 | Kough | ............... | H01Q 1/243 343/702 |
| 2012/0320514 A1 * | 12/2012 | Franz | ............... | F16M 11/105 361/807 |
| 2013/0293430 A1 * | 11/2013 | Henty | ............... | F16B 1/00 343/720 |
| 2014/0376179 A1 * | 12/2014 | Jenkins | ............... | G06F 1/1698 361/679.55 |
| 2015/0173221 A1 * | 6/2015 | Yoo | ............... | H05K 5/0234 248/455 |

(Continued)

*Primary Examiner* — Yuwen Pan
*Assistant Examiner* — Rui M Hu
(74) *Attorney, Agent, or Firm* — Fogarty LLP

(57) ABSTRACT

Embodiments of systems and methods for a kickstand with a Radio Frequency (RF) window are described. In some embodiments, an Information Handling System (IHS) may include a plurality of components and a housing configured to hold the plurality of components, where the housing includes a kickstand having an RF window coupled to a plate.

4 Claims, 6 Drawing Sheets

(56) References Cited

U.S. PATENT DOCUMENTS

| | | | | |
|---|---|---|---|---|
| 2016/0216742 A1* | 7/2016 | Lee | ......................... | G06F 1/1679 |
| 2016/0234356 A1* | 8/2016 | Thomas | ................... | H04K 3/84 |
| 2016/0308563 A1* | 10/2016 | Ouyang | ............... | H01Q 25/005 |
| 2017/0168524 A1* | 6/2017 | Kim | ....................... | G06F 1/1626 |
| 2017/0262018 A1* | 9/2017 | Kim | ....................... | G06F 1/1626 |
| 2018/0123242 A1* | 5/2018 | Jeon | ......................... | H01Q 5/30 |
| 2018/0217633 A1* | 8/2018 | Ku | ......................... | G06F 1/1681 |
| 2018/0358826 A1* | 12/2018 | Allen | .................... | H02J 7/0044 |
| 2019/0078729 A1* | 3/2019 | Wendt | ................... | G06F 1/1637 |
| 2019/0237848 A1* | 8/2019 | Ramasamy | ........... | G06F 1/1683 |
| 2020/0124229 A1* | 4/2020 | Han | ....................... | G06F 1/1681 |
| 2020/0178662 A1* | 6/2020 | Takano | ................. | A47B 23/04 |
| 2020/0192429 A1* | 6/2020 | Wu | ......................... | G06F 1/166 |
| 2020/0233537 A1* | 7/2020 | Hong | .................... | G06F 1/1694 |
| 2021/0048843 A1* | 2/2021 | Lin | ....................... | G06F 1/1626 |
| 2021/0151857 A1* | 5/2021 | Huang | .................. | G06F 1/1616 |
| 2021/0289645 A1* | 9/2021 | Wang | .................... | H05K 5/023 |
| 2021/0311523 A1* | 10/2021 | Bai | ....................... | H05K 5/0226 |
| 2021/0409088 A1* | 12/2021 | Chang | ................. | H04W 52/288 |
| 2022/0271413 A1* | 8/2022 | Hsu | ....................... | H01Q 5/307 |
| 2022/0294097 A1* | 9/2022 | Yamamoto | ............ | G06F 1/1662 |
| 2022/0336957 A1* | 10/2022 | Lee | ..................... | H01Q 9/0485 |
| 2023/0028777 A1* | 1/2023 | Sung | ................... | H01Q 1/2291 |

\* cited by examiner

KICKSTAND WITH RADIO FREQUENCY (RF) WINDOW

FIELD

This disclosure relates generally to Information Handling Systems (IHSs), and more specifically, to systems and methods for a kickstand with a Radio Frequency (RF) window.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Portable IHSs may have different form factors, such as: laptops, tablets, smartphones, convertible devices, etc. In some cases, the IHS's housing can include kickstand. A kickstand is a mechanical device on an IHS's housing that allows the housing to be kept upright without leaning against another object or the aid of a person.

To enable wireless communications, Radio Frequency (RF) antennas may be placed along the sides of an IHS's housing. As the inventors hereof have recognized, however, this practice presents challenges when housing has a kickstand because the kickstand can block electromagnetic signals transmitted and received by the RF antennas. To address these, and other issues, systems and methods described herein provide a kickstand with an RF window.

SUMMARY

Embodiments of systems and methods for a kickstand with a Radio Frequency (RF) window are described. In an illustrative, non-limiting embodiment, an Information Handling System (IHS) may include a plurality of components and a housing configured to hold the plurality of components, where the housing includes a kickstand having an RF window coupled to a plate.

The housing may have a tablet, smartphone, or laptop form factor. When the kickstand is in a closed configuration, the RF window may be adjacent an RF antenna disposed within the housing. For example, the RF antenna may include a fifth-generation cellular network (5G) antenna. Also, the RF window may be molded onto an edge of the plate.

The RF window may include a first portion adhered to a lateral surface of the plate and a second portion adhered to a front or back surface of the plate. The second portion may be tapered. A thickness of the first portion may be inversely proportional to a distance between the RF antenna and the plate. Additionally, or alternatively, the thickness of the first portion may be twice a thickness of the plate. Also, a width of the first portion may be inversely proportional to a distance between the RF antenna and the plate.

In some cases, the plate may include at least one of: magnesium, or aluminum. Meanwhile, the RF window may include a resin or polymer blend.

In another illustrative, non-limiting embodiment, a kickstand may include a plate and an RF window coupled to the plate. When the plate is disposed against a housing of an IHS, the RF window may be adjacent an RF antenna. The RF window may be molded onto an edge of the plate. In yet another illustrative, non-limiting embodiment, a method may include identifying a location of an RF antenna within a housing of an IHS and placing an RF window in a kickstand coupled to the housing, where the RF window is disposed next to the location when the kickstand is in a closed configuration. Placing the RF window may include adhering a plastic material around a metallic edge of the kickstand. Moreover, adhering the plastic material may include adhering a first portion of the plastic material to a lateral surface of the kickstand and adhering a second portion of the plastic material to a front or back surface of the kickstand.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. It should be appreciated that although certain embodiments are discussed in the context of a personal computing device, other embodiments may utilize various other types of IHSs.

Figure 1:
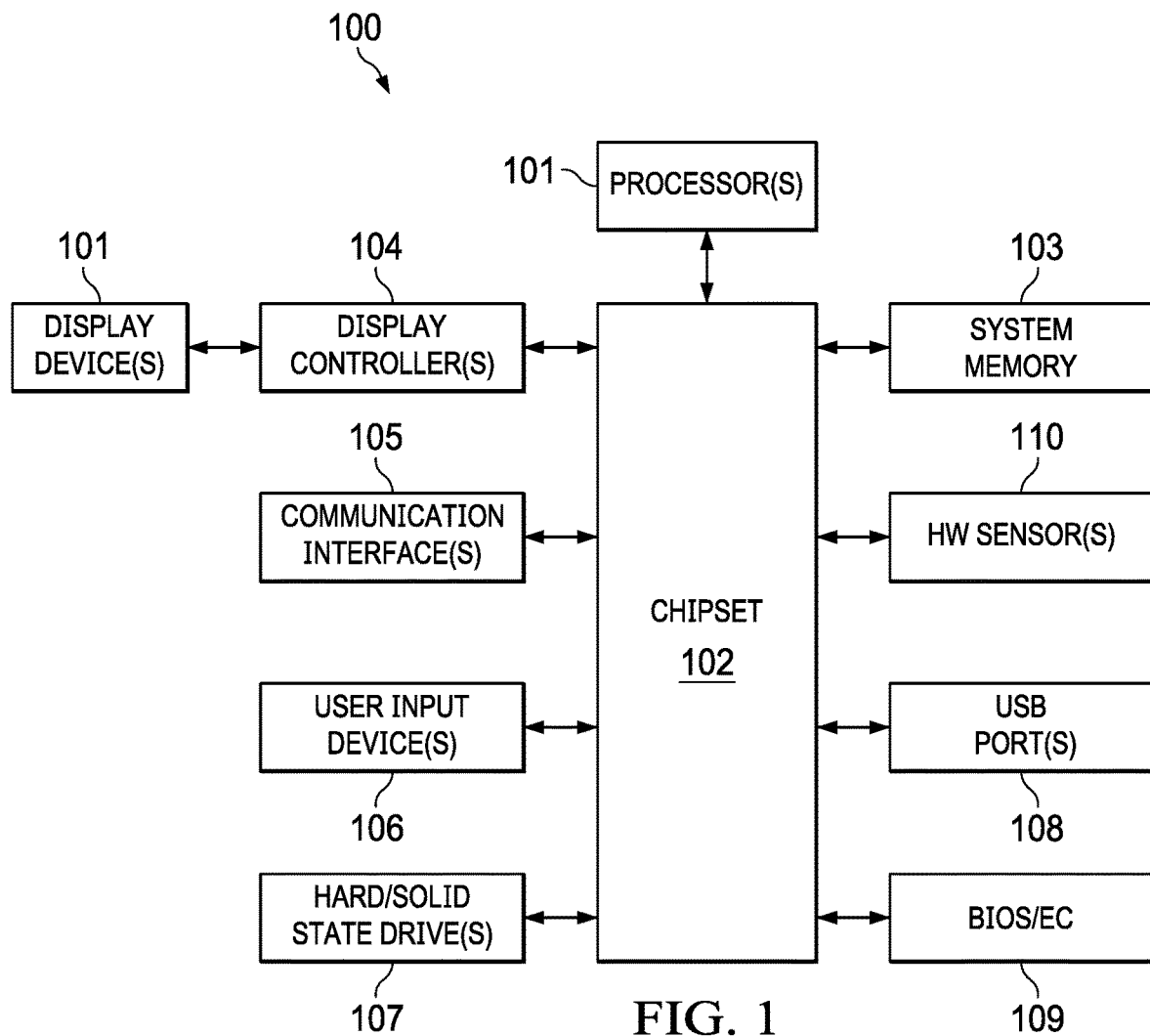
FIG. 1 is a diagram of an example of an Information Handling System (IHS), according to some embodiments.

FIG. 1 is a block diagram of components of IHS 100, according to some embodiments. As depicted, IHS 100 includes processor(s) 101. In various embodiments, IHS 100 may be a single-processor system, or a multi-processor system including two or more processors. Processor(s) 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor(s) 101. Chipset 102 (e.g., a Platform Controller Hub or "PCH," a Fusion Controller Hub or "FCH," etc.) may provide processor(s) 101 with access to several resources. In some cases, chipset 102 may utilize a QuickPath Interconnect (QPI) bus to communicate with processor(s) 101. Chipset 102 may also be coupled to communication interface(s) 105 to enable communications between IHS 100 and various wired and/or wireless networks, such as Ethernet, WiFi, BLUETOOTH, cellular or mobile networks (e.g., Code-division multiple access or "CDMA," Time-division multiple access or "TDMA," Long-Term Evolution or "LTE," 5G, etc.), satellite networks, or the like. In some cases, communication interface(s) 105 may be coupled to chipset 102 via a PCIe bus.

Chipset 102 may be coupled to display controller(s) 104, which may include one or more or Graphics Processor Unit(s) (GPUs) on a graphics bus, such as an Accelerated Graphics Port (AGP) or Peripheral Component Interconnect Express (PCIe) bus. As shown, display controller(s) 104 provide video or display signals to display device(s) 111. In some cases, display controller(s) 104 may also include a touchscreen controller that enables a user to provide touch inputs (e.g., finger, pen, etc.) directly on the surface of display device(s) 111. In other implementations, any number of display controller(s) 104 or display device(s) 111 may be used.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide processor(s) 101 and/or display controller(s) 104 with access to system memory 103. In various embodiments, system memory 103 may be implemented using any suitable technology, such as static RAM (SRAM), dynamic RAM (DRAM) or magnetic disks, or any nonvolatile/Flash-type memory, such as a solid-state drive (SSD) or the like.

Chipset 102 may also provide access to one or more hard disk and/or solid-state drive(s) 107. In certain embodiments, chipset 102 may also provide access to one or more optical drives or other removable-media drives. In certain embodiments, chipset 102 may further provide access to one or more Universal Serial Bus (USB) port(s) 108.

Chipset 102 may be coupled to one or more user input device(s) 106, for example, via a super I/O controller or the like. Examples of user input device(s) 106 include, but are not limited to, a keyboard, mouse, touchpad, stylus or pen, totem, etc. Each of user input device(s) 106 may include a respective controller (e.g., a touchpad may have its own touchpad controller) that interfaces with chipset 102 through a wired or wireless connection (e.g., via communication interface(s) 105).

In certain embodiments, chipset 102 may also provide an interface for communications with one or more hardware sensor(s) 110. Sensor(s) 110 may be disposed on or within the housing of IHS 100, and may include, but are not limited to: electric, magnetic, Hall, radio, optical, photo, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor(s) 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

EC 109 may also implement operations for detecting certain changes to the physical configuration or posture of IHS 100. For instance, where IHS 100 as a 2-in-1 laptop/tablet form factor, EC 109 may receive inputs from a lid position or hinge angle sensor (e.g., sensor(s) 110), and it may use those inputs to determine: whether the two sides of IHS 100 have been latched together to a closed position or a tablet position, the magnitude of a hinge or lid angle, etc.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as a System-On-a-Chip (SoC). In certain embodiments, IHS 100 may be implemented as different types of portable IHSs including, but not limited to: laptops, tablets, smartphones, convertible devices (e.g., dual display IHSs), video game consoles, etc.

Figure 2:
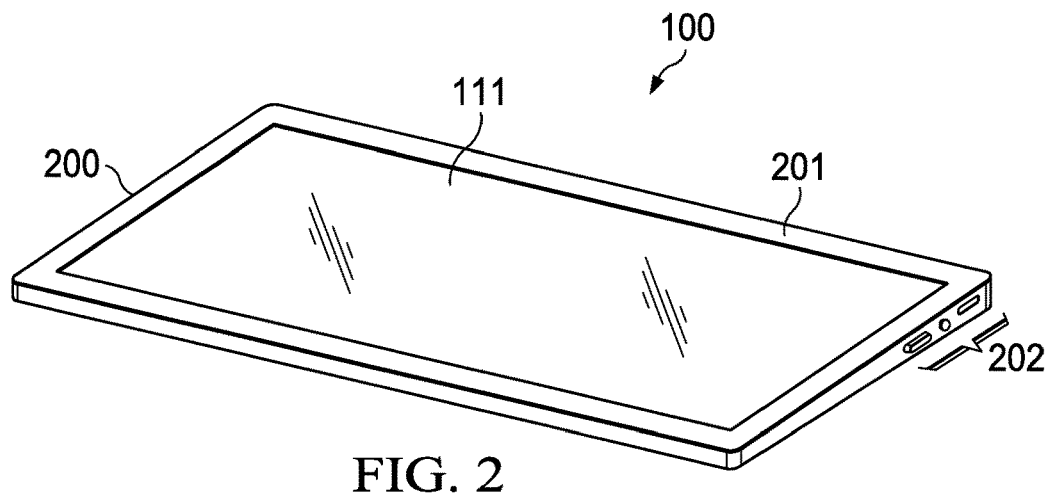
FIG. 2 is a diagram of an example of a portable IHS, according to some embodiments.
Figure 4:
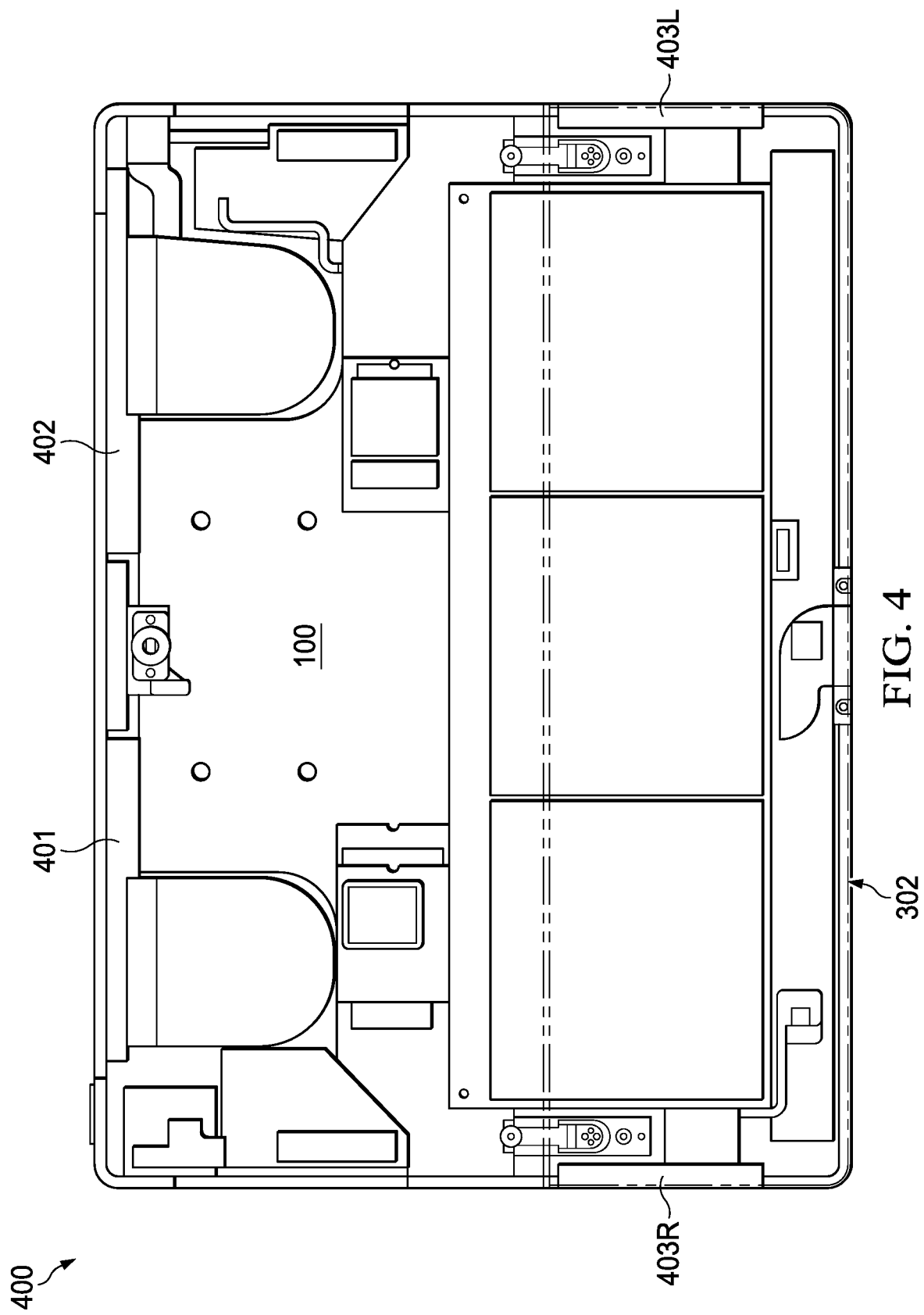
FIG. 4 is a diagram of an example of the interior of an IHS's housing having multiple RF antennas, according to some embodiments.

FIG. 2 is a diagram of an example of portable housing 200 for IHS 100 (e.g., a tablet device). The bottom surface of housing 200 rests on a planar surface, such as a tabletop, to provide a user with touchscreen display 111 with which to interact. In this example, housing 200 includes one or more openings 202 for power buttons, volume controls, audio/video jacks or ports, a charging port, etc. Housing 200 also includes bezel, edge, frame, or border 201 around at least a portion of its perimeter, where one or more RF antennas (e.g., 5G antennas) may be disposed, as shown in FIG. 4. In various implementations, housing 200 may generally be made of a metal or metallic alloy or material (e.g., magnesium, aluminum, etc.), at least in part, due to its heat conduction and RF shielding properties.

Figure 3A:
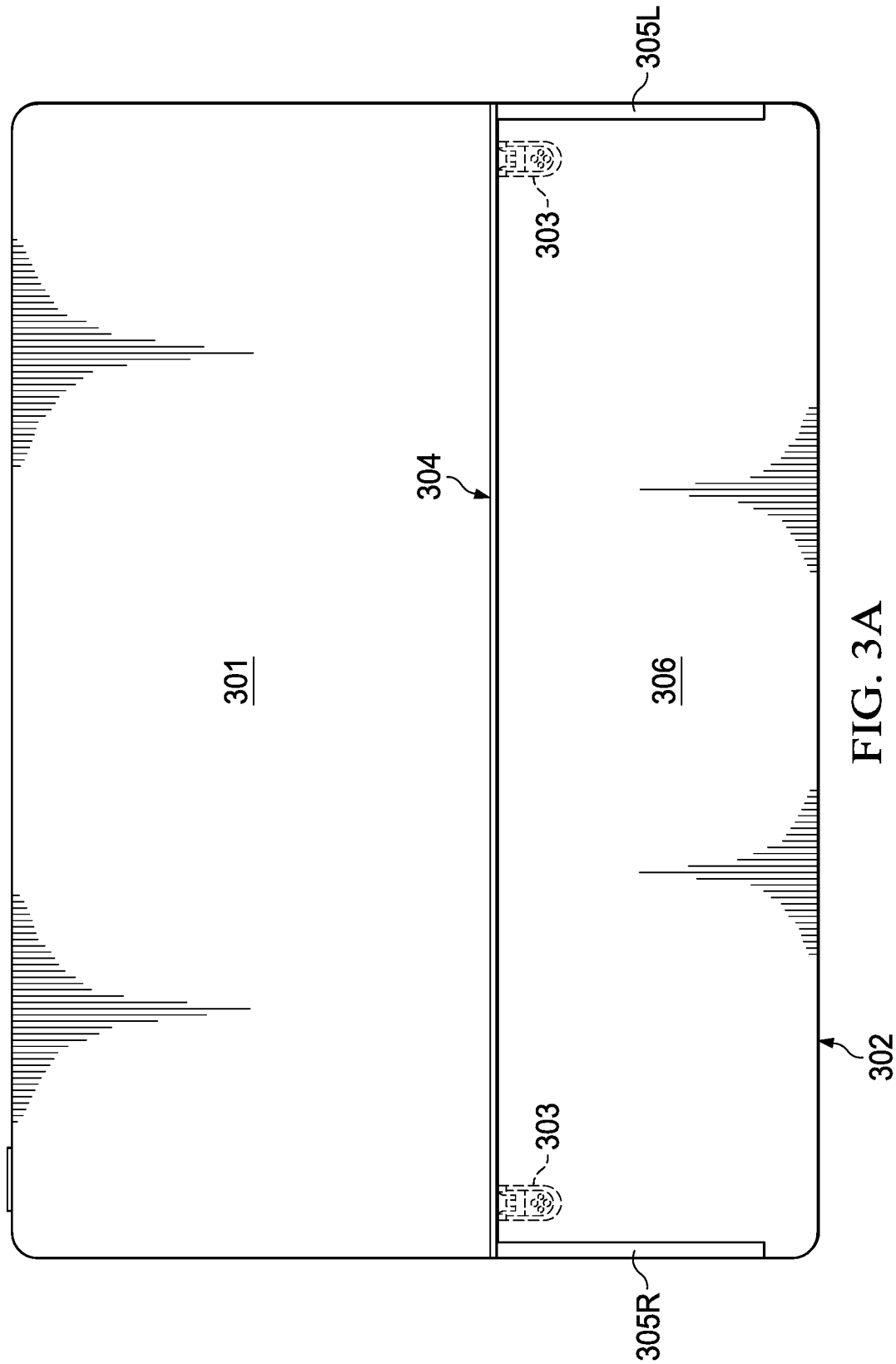
FIGS. 3A and 3B are diagrams of an example of an IHS's housing having a kickstand with RF windows, according to some embodiments.
Figure 3B:
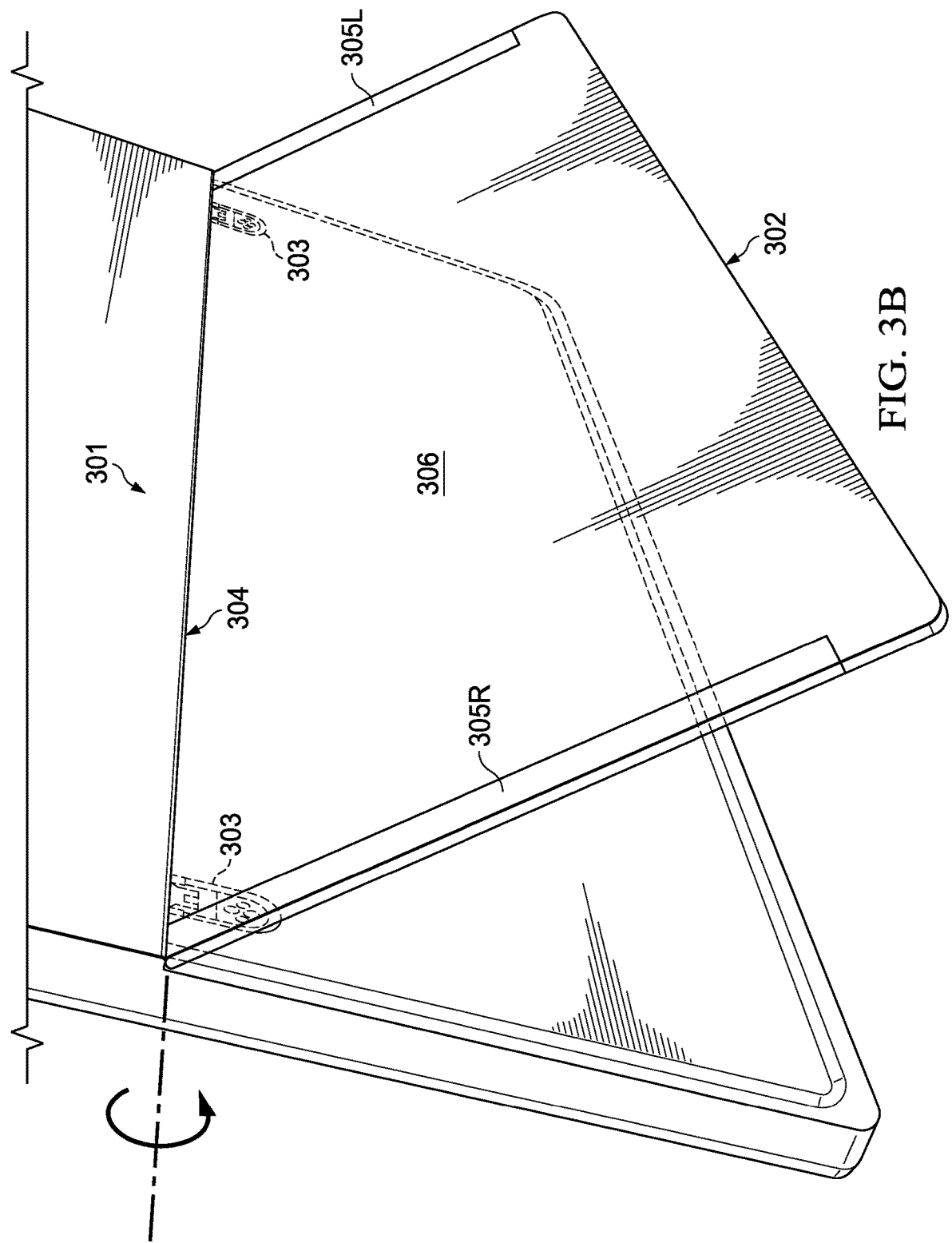

FIGS. 3A and 3B are diagrams of an example of an IHS's housing having kickstand 302 with RF windows 305L and 305R. The back side of the housing (opposite display 111) includes fixed portion 301 and kickstand 302. Kickstand 302 includes kickstand plate 306, RF window 305L, and RF window 305R. Kickstand 302 may be coupled to fixed portion 301 of the IHS housing via one or more hinges 303, such that kickstand 302 can swivel or rotate around axis 304 with respect to fixed portion 301 between its closed and open (i.e., deployed) positions.

Particularly, when kickstand 302 is closed, as shown in FIG. 3A, plate 306 is coplanar with fixed portion 301 and the IHS housing may be laid horizontally on horizontal surface. When opened or deployed, as shown in FIG. 3B, plate 306 rotates away from fixed portion 301 around axis 304 so that kickstand 302 can keep the IHS housing standing upright (at an angle) on the horizontal surface without having to lean against another object or be held by a person.

In various embodiments, plate 306 may be made of a metal or metallic alloy or material, similarly to fixed portion 301 (and the rest of housing 200). Conversely, RF windows 305L and 305R may be made of a plastic material or compound, resin, or polymer blend, such as, for example: Acrylonitrile Butadiene Styrene (ABS), High-density Polyethylene (HDPE), Polyether Ether Ketone (PEEK), polyamide (Nylon), polycarbonate (PC), polyethylene (PE), polyetherimide (PEI), polybutylene terephthalate (PBTR), polyoxymethylene (POM), polypropylene (PP), polypropiolactone (PPL), polyvinyl chloride (PVC), thermoplastics, etc. Alternatively, RF windows 305L and 305R may be made of acrylic, silicone, glass, ceramic, or other suitable RF-transparent material.

Moreover, RF windows 305L and 305R may be disposed around selected sections of the edge of kickstand 302 corresponding to the locations of RF antennas disposed within the IHS housing. Particularly, RF windows 305L and 305R may each be adjacent to a respective RF antenna disposed in the IHS housing (e.g., within border 201) when kickstand 302 is closed, as shown in FIG. 5. In cases with more or fewer RF antennas disposed in the IHS housing, more or fewer RF windows 305L and 305R may be used. The length of each RF window 305L or 305R may be the same as, or proportional to, the length of each underlying RF antenna element.

FIG. 4 is a diagram of an example of the interior of an IHS housing having multiple RF antenna elements 401, 402, 403L, and 403R. In some implementations, main RF antenna elements 401 and 402 may provide 5G capabilities to communication interface(s) 105 of IHS 100. These 5G capabilities may require the use of multiple-input, multiple-output (MIMO) RF antenna elements 403L and 403R to increase the quality, throughput, and capacity of the radio link.

Ordinarily, when in its closed configuration, kickstand 302 would cover RF antennas 403L and 403R and its metallic nature would at least partially block RF transmission and reception of those antennas. Using the systems and methods described herein, however, RF windows 305L and 305R may be integrated into selected portions of the lateral edges of plate 306 to improve the transmission and reception of underlying RF antennas 403L and 403R when kickstand 302 is closed against the IHS housing.

Figure 5A:
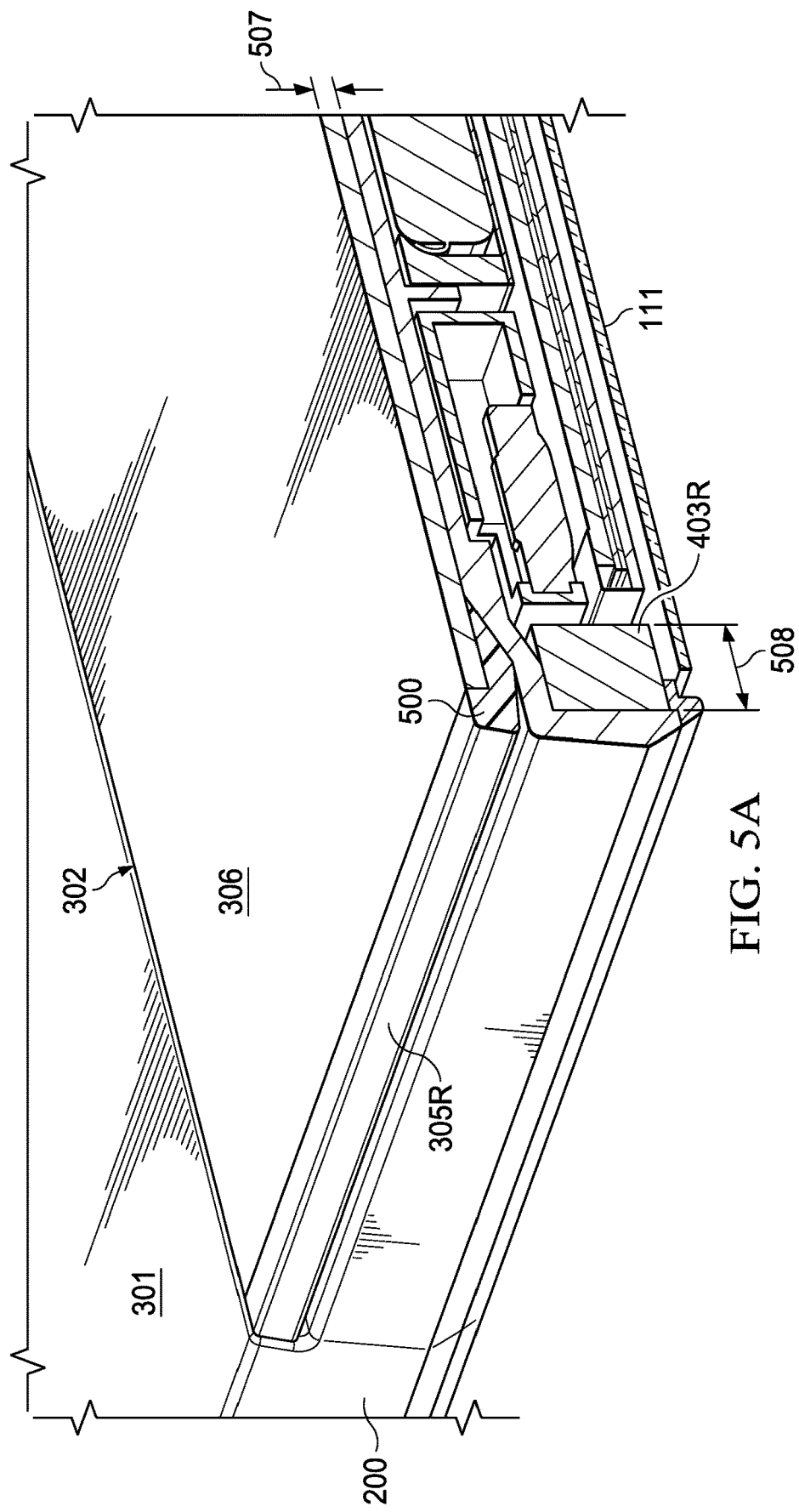
FIG. 5A is a diagram of a cutaway view of an example of a kickstand with an RF window, according to some embodiments.
Figure 5B:
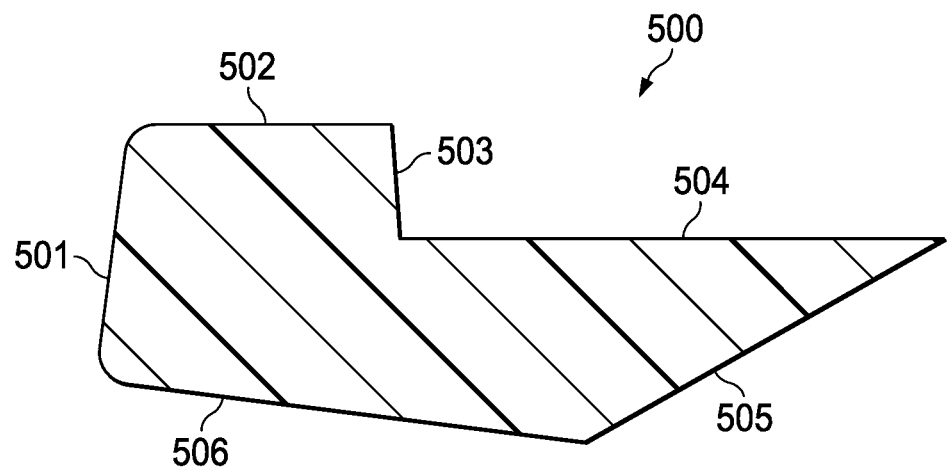
FIG. 5B is a diagram of a cross section of an RF window, according to some embodiments.

FIG. 5A is a diagram of cutaway view of an example of kickstand 302 with RF window 305R, and FIG. 5B is a diagram of cross section 500 of RF window 305R. In some embodiments, RF window 305R may be cast, molded, injected, and/or adhered to plate 306 of kickstand 302. Segment 503 may be cast molded, injected, or adhered to the lateral edge of plate 306, and segment 504 may be cast, molded, injected, or adhered to a surface of plate 306.

Specifically, cross section 500 of RF window 305R includes first segment 501, second segment 502 coupled at approximately 90° (i.e., within 5%, 10%, 25%, etc.) to first segment 501, such that an initial point of second segment 502 meets an end point of first segment 501, and third segment 503 coupled at approximately 90° to second segment 502, such that an initial point of third segment 503 meets an end point of second segment 502. The length of third segment 503 may be the same as thickness 507 of length of the lateral edge or thickness of plate 306.

Cross section 500 of RF window 305R shows fourth segment 504 coupled at approximately 90° to third segment 503, such that an initial point of fourth segment 504 meets an end point of third segment 503, and fifth segment 505 coupled at an acute angle to fourth segment 504, such that an initial point of fifth segment 505 meets an end point of fourth segment 504, and sixth segment 506 coupled at an obtuse angle to fifth segment 505, such that an initial point of sixth segment 506 meets both an end point of fifth segment 505 and the initial point of first segment 501.

First and second segments 501 and 502 are approximately perpendicular with respect to each other, first and third segments 501 and 503 are approximately parallel with respect to each other, and second and fourth segments 502 and 504 are also approximately parallel with respect to each other. In some cases, the intersections between first segment 501 and second segment 502 and/or between the sixth segment 506 and first segment 501 may include 45-degree corners. Moreover, segments 505 and/or 506 are tapered.

The combined lengths of second and fourth portions 502 and 504 may be the approximately the same or greater than width 508 of RF antenna 403R. Additionally, or alternatively, the length of first segment 501 and/or of second segment 502 may be inversely proportional to the distance between RF antenna 403R and plate 306. For example, in some cases, first segment 501 may be approximately twice the thickness 507 of plate 306.

Although in other embodiments the cross-section of RF window 305R may assume other shapes, angles, and lengths, the inventors hereof have determined that the specific shape of cross section 500 of FIG. 5 is particularly well-suited for providing an effective RF window 305R for 5G MIMO antenna 403R to operate with minimal electromagnetic signal attenuation due to plate 306 when kickstand 302 is closed.

Figure 6:
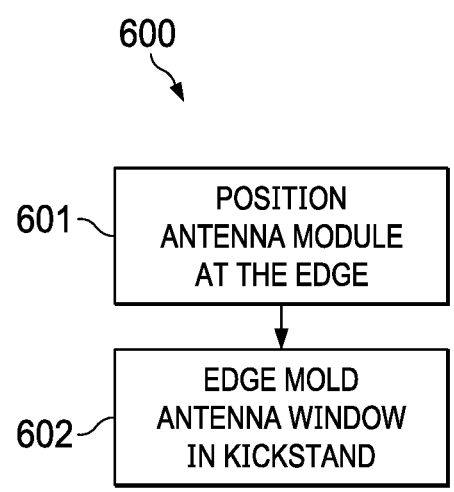
FIG. 6 is a flowchart or a method for providing a kickstand with an RF window, according to some embodiments.

FIG. 6 is a flowchart or method 600 for providing kickstand 302 with one or more RF windows 305L or 305R. In various embodiments, method 600 may be performed using any suitable casting, molding, injection, or adhesive manufacturing process. At 601, method 600 includes identifying a position or location of an RF antenna module (e.g., RF antennas 403L and 403R) on the edge of IHS housing 200. Then, at 602, method 600 includes edge molding an antenna window (e.g., RF windows 305L and 305R) around the edge of plate 306 in a location corresponding to the location of the RF antenna module when kickstand 302 is a in closed position, such that the antenna window is parallel and/or adjunct to its respective underlying RF antenna module.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims

The invention claimed is:

1. A kickstand, comprising:
    a plate coupled to a housing of an Information Handling System (IHS); and
    a Radio Frequency (RF)-transparent window coupled to the plate, wherein the RF-transparent window is next to an RF antenna disposed within the housing when the kickstand is in a closed configuration, and wherein the RF-transparent window comprises:
        a first end separated by a length from a second end; and
        a cross-section disposed at the first end and the second end, each cross-section having a surface substantially perpendicular to the length, each surface having a closed perimeter consisting of a first side, a second side, a third side, a fourth side, a fifth side, and a sixth side, wherein:
            the second side is disposed at an angle of substantially 90° relative to the first side;
            the third side is disposed at an angle of substantially 90° relative to the second side;
            the fourth side is disposed at an angle of substantially 90° relative to the third side;
            the fifth side is disposed at an acute angle relative to the fourth side; and
            the sixth side is disposed at an obtuse angle relative to the fifth side.

2. The kickstand of claim 1, wherein when the plate is disposed against a housing of an Information Handling System (IHS), the RF-transparent window is adjacent the RF antenna.

3. The kickstand of claim 1, wherein the RF-transparent window is molded onto an edge of the plate.

4. The kickstand of claim 1, wherein the plate comprises at least one of: magnesium or aluminum, and wherein the RF-transparent window further comprises a plastic material or compound, resin, or polymer blend.

* * * * *